US006752256B2

(12) United States Patent
Knudson

(10) Patent No.: US 6,752,256 B2
(45) Date of Patent: Jun. 22, 2004

(54) SYSTEM FOR IMPROVING WOOD STRAND ORIENTATION IN A WOOD STRAND ORIENTER USING ROTATING ORIENTING FINGERS

(75) Inventor: Robert M. Knudson, Coquitlam (CA)

(73) Assignee: Forintek Canada Corp., Vancouver (CA)

( * ) Notice: Subject to any disclaimer, the term of this patent is extended or adjusted under 35 U.S.C. 154(b) by 0 days.

(21) Appl. No.: 10/227,349

(22) Filed: Aug. 26, 2002

(65) Prior Publication Data

US 2004/0035679 A1 Feb. 26, 2004

(51) Int. Cl.[7] ................................................ B65G 17/32

(52) U.S. Cl. ....................... 198/382; 264/113; 264/108; 198/384

(58) Field of Search ................................ 198/384, 382; 264/113, 108

(56) References Cited

U.S. PATENT DOCUMENTS

| | | | | | |
|---|---|---|---|---|---|
| 2,744,045 | A | * | 5/1956 | Collins | 264/115 |
| 3,115,431 | A | | 12/1963 | Stokes et al. | |
| 3,807,931 | A | | 4/1974 | Wood et al. | |
| 4,505,868 | A | | 3/1985 | Krueger et al. | |
| 4,506,778 | A | | 3/1985 | Kilpela | |
| 4,623,058 | A | | 11/1986 | Bossler | |
| 4,666,029 | A | | 5/1987 | Bürkner | |
| 4,836,388 | A | | 6/1989 | Bielagus | |
| 5,325,954 | A | | 7/1994 | Crittenden et al. | |
| 5,404,990 | A | | 4/1995 | Barnes et al. | |
| 5,487,460 | A | | 1/1996 | Barnes | |
| 5,676,236 | A | | 10/1997 | Barnes et al. | |
| 5,871,080 | A | * | 2/1999 | Manzi et al. | 198/396 |

FOREIGN PATENT DOCUMENTS

| | | |
|---|---|---|
| CA | 1232513 | 2/1988 |

* cited by examiner

*Primary Examiner*—Richard W. Ridley

(57) ABSTRACT

A system for improving wood strand orientation in a wood strand orienter having a plurality of orienter disks. The system includes a plurality of axially-spaced, parallel pre-orienting shafts positioned in a second plane above and substantially parallel to the orienter disks, each one of the pre-orienting shafts having a plurality of wheels mounted thereon. Each of the wheels has a hub and a plurality of outwardly-extending finger members. When the pre-orienting shafts are positioned over the disks, each one of the finger members passes, in turn, through a portion of the volume defined between the two adjacent orienter disks the wheel sits between. This permits bridged wood strands to be turned and straightened, reducing the "% overs", the percentage of strands bridging the orienter disks and carried across the top of the orienter without falling through the orienter.

8 Claims, 4 Drawing Sheets

SYSTEM FOR IMPROVING WOOD STRAND ORIENTATION IN A WOOD STRAND ORIENTER USING ROTATING ORIENTING FINGERS

TECHNICAL FIELD

The present invention relates to machinery used to produce composite wood products, and in particular relates to improvements in rotating disk-type wood strand orienter machinery.

BACKGROUND

Composite wood products such as oriented strand board ("OSB"), particleboard and the like are produced from wood particles or strands. During the manufacturing process, strands of wood are typically formed into mats with the orientation of the wood strands controlled by strand-orienting machinery. Such strands are generally elongated (longer than they are wide), and when producing OSB it is desirable to have these strands aligned longitudinally and in a generally parallel fashion, and lying flat on the mat. Generally, the quality of a composite wood product depends in large part upon how well aligned the wood strands are in the wood strand mat produced by the orienter.

Commonly used strand orienters employ rotating disks. One type of orienter known in the art is the "Stokes" type of orienter, which is described in detail in U.S. Pat. No. 3,115,431, which issued on Dec. 24, 1963 to Stokes et al. This orienter uses a plurality of intermeshed rotating disks mounted on a plurality of substantially parallel shafts oriented in a plane beneath a supply of wood strands. The wood strands are permitted to fall down upon the orienting disks, which, while turning, tend to align the strands longitudinally. The aligned strands fall between the disks to form a mat of strands on a platform or conveyor beneath the disks. The mat is accordingly formed of particles aligned generally longitudinally, although the strands are never perfectly aligned. The Stokes arrangement is shown in FIG. 1.

Another type of orienter known in the art, which also employs orienting disks, is the type known as the "Bürkner" orienter. The Bürkner orienter is disclosed in U.S. Pat. No. 4,380,284, which issued on Apr. 19, 1983. In the Bürkner orienter, disks on adjacent shafts are arranged in pairs in side-by-side relationship, defining passages for allowing strands of wood to pass through to form a mat. The Bürkner arrangement is shown in FIG. 2.

The disclosures of the aforementioned Stokes and B ürkner patents are incorporated herein by reference.

One continuing problem with wood strand orienters of the type discussed above is that many strands bridge two or more adjacent disks, riding along the tops of all of the disks and never falling through two adjacent disks onto the mat. These strands which bridge the orienting disks and which are carried along by successive disks over the orienter in its entirety are known in the art as "overs". It is typical to measure "overs" as a percentage of starting material.

It is generally preferred to have adjacent disks in an orienter relatively close to one another, with narrow spacing (in the order of about 2 inches) between them. Closer disks tend to produce a mat having more highly-aligned strands. However, the closer the disks are to one another, the lower is the volume of material which is able to fall between adjacent disks. "Overs", therefore, are particularly problematic when the disks are relatively close together. The percentage of overs also tends to increase at higher material feed rates.

Various attempts have been made to try to ameliorate this problem. One example of a suggested solution will be found disclosed in U.S. Pat. No. 5,487,460, which issued on Jan. 30, 1986 to Barnes. In this patent, a "multi-deck" orienter is described, which has three decks of orienting disk sets through which strands must fall, each successive deck purportedly aligning the strands to a greater degree. A similar arrangement may be found in U.S. Pat. No. 5,325,954, which issued on Jul. 5, 1994 to Crittenden et al. Crittenden shows a strand "pre-orienter". In both the Crittenden et al and the Barnes patents, the spacing between the disks in the upper "deck" is significantly larger than the spacing between the disks in the decks below them. However, it has been found Crittenden et al. and the Barnes arrangements occupy a large amount of space, and do not offer enough improvement in strand alignment over the Stokes and Bürkner orienting arrangements to justify their implementation in commercial OSB manufacture.

A need remains, therefore, for a wood strand orienter particularly suited to orienting strands in substantially parallel relationship with a low amount of "overs" at commercial material feed rates.

SUMMARY OF INVENTION

The present invention provides a system for improving wood strand orientation in a wood strand orienter having a plurality of axially-spaced, parallel orienter shafts positioned in a first plane, with each shaft bearing a plurality of axially spaced orienter disks. The system comprises a plurality of axially-spaced, parallel pre-orienting shafts positioned in a second plane above and substantially parallel to the first plane, the pre-orienting shafts substantially parallel to the orienter shafts; and a plurality of wheels mounted on each one of the pre-orienting shafts, each one of the wheels having a hub and a plurality of finger members extending radially outwardly from the hub. Each one of the wheels is positioned between two adjacent orienter disks and extends downwardly into a volume defined between the two adjacent orienter disks. Each one of the pre-orienter shafts may be positioned vertically above one of the orienter shafts.

The system of the present invention also provides means for rotating the pre-orienter shafts in a direction which causes the finger members to sweep against the direction of travel of wood strands along the tops of the orienter disks, thereby allowing the finger members to turn and straighten wood strands which are bridged over the tops of two or more of the adjacent orienter disks, allowing these strands to more readily fall between the disks. The wheels may have between 2 and 6 finger members.

In the preferred embodiment of the invention, one wheel is positioned between each pair of adjacent orienter disks, and is positioned more closely to one of the disks than to the other. The wheels may be spaced at 1.5 inch or 2 inch intervals, or at some other interval, depending upon the spacing of the orienter disks.

BRIEF DESCRIPTION OF DRAWINGS

In the accompanying drawings which illustrate specific embodiments of the invention, but which should not be construed as restricting the spirit or scope of the invention in any way.

DESCRIPTION

Throughout the following description, specific details are set forth in order to provide a more thorough understanding of the invention. However, the invention may be practised without these particulars. In other instances, well known elements have not been shown or described in detail to avoid unnecessarily obscuring the invention. Accordingly, the specification and drawings are to be regarded in an illustrative, rather than a restrictive, sense.

Figure 1:
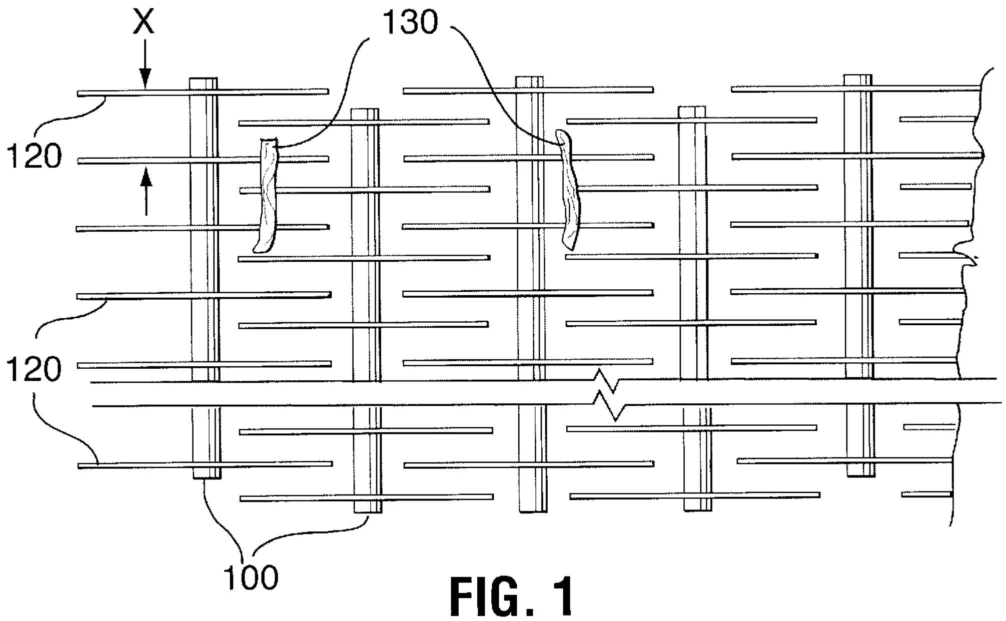
FIG. 1 PRIOR ART
FIG. 1 is a schematic plan view of a Stokes-type orienter arrangement.
Figure 2:
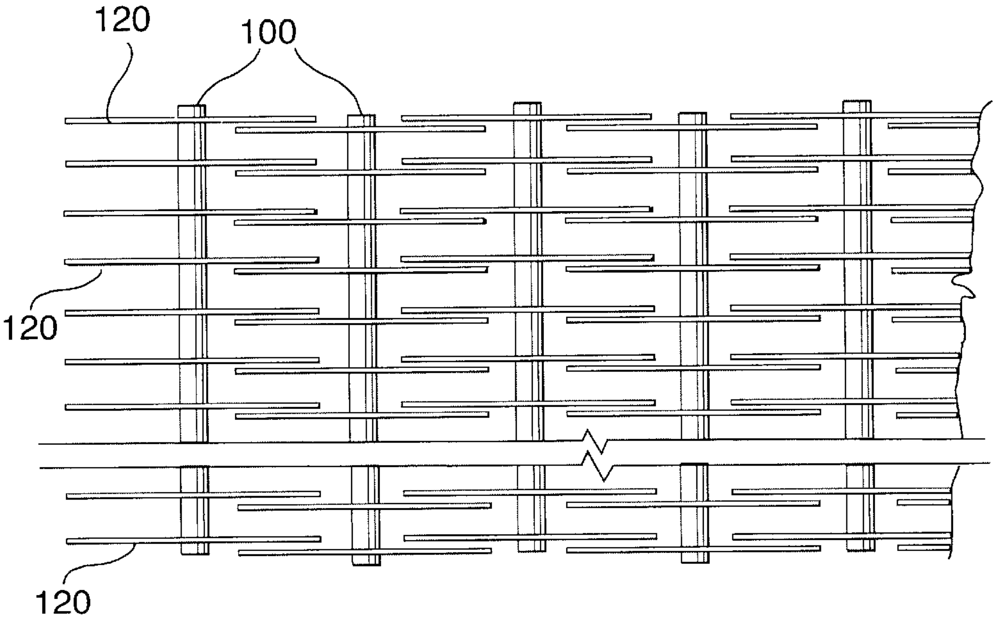
FIG. 2 PRIOR ART
FIG. 2 is a schematic plan view of a Bürkner-type orienter arrangement.

Referring first to FIGS. 1 and 2, prior art wood strand orienters are generally of two types, known in the art as the Stokes-type orienter (FIG. 1) and the Bürkner-type orienter (FIG. 2). In each of these orienters, there is provided a plurality of axially-spaced, parallel orienter shafts 100 positioned in a plane. Each shaft 100 bears a plurality of axially-spaced orienter disks 120, each one separated from an adjacent disk, in a commercial orienter, by a distance X of about 2 inches, as shown in FIG. 1.

Shafts 100 are typically arranged such that disks 120 from adjacent shafts 100 are intermeshed. Intermeshed disks 120 may be equally spaced from one another, as shown in FIG. 1, or may be off-set, as shown in FIG. 2.

To make a mat of aligned wood strands, the orienter shafts are turned, usually only in one direction, causing disks 120 to rotate in turn. Wood strands are fed to the orienter from above. The strands are allowed to find their way through the spaces between the disks, thereby tending to align themselves longitudinally, as well described in the art, to form mats underneath the rows of disks.

As described earlier, one problem with such prior art orienters is that many of the strands which are fed to the disks find themselves bridging the tops of adjacent disks, as shown in FIG. 1(bridged strands are indicated by numeral 130), in such a manner as to never fall between the disks 120. Bridged strands 130 are carried by the orienter to the final row of disks, where they build up and must be dislodged from the orienter.

Referring to FIGS. 3–6, the present invention provides a system for improving wood strand orientation in a wood strand orienter of the type shown in FIGS. 1 and 2 by reducing the number of wood strands 130 bridging the orienter along its entire length. The system, denoted generally herein by the numeral 10, has a plurality of axially-spaced, parallel pre-orienting shafts 20 positioned in a second plane $A^1$–$B^1$ (FIGS. 5 and 6) above and substantially parallel to the plane A–B occupied by the orienter shafts 100. Pre-orienting shafts 20 are substantially parallel to orienter shafts 100, and may be conveniently mounted to a frame 25. Preferably, one pre-orienter shaft 20 is provided for each orienter shaft 100, although this is not necessary.

Figure 8:
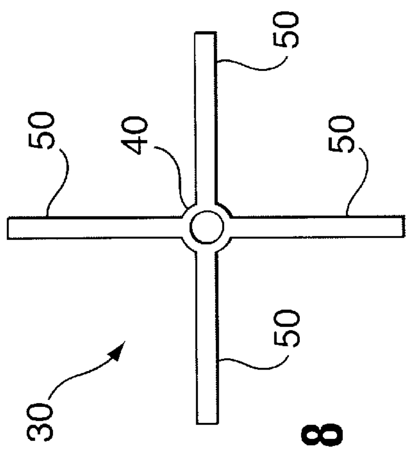
FIG. 8 is a side view of a wheel with finger members employed by the system of the present invention.

A plurality of wheels 30 are mounted on each one of pre-orienting shafts 20. Each wheel (shown in greater detail in FIG. 8) has a hub 40, and a plurality of finger members 50 extending radially outwardly from hub 40. Finger members 50 are preferably equally spaced around the perimeter of hub 40. Although wheel 30 is illustrated in FIG. 8 as having four finger members, and in FIGS. 5 and 6 as having three finger members, it is anticipated by the inventors that any number of fingers between two and six could be efficiently used on wheels 30.

Figure 3:
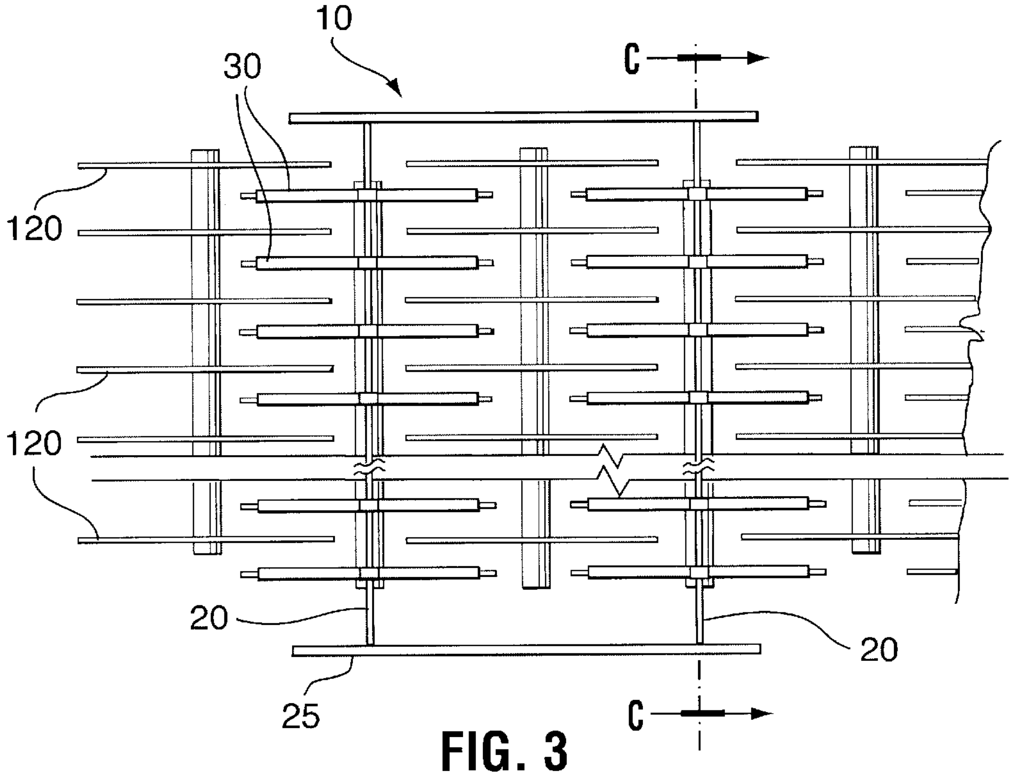
FIG. 3 is a schematic plan view of the system of the present invention positioned above the Stokes-type orienter shown in FIG. 1.
Figure 4:
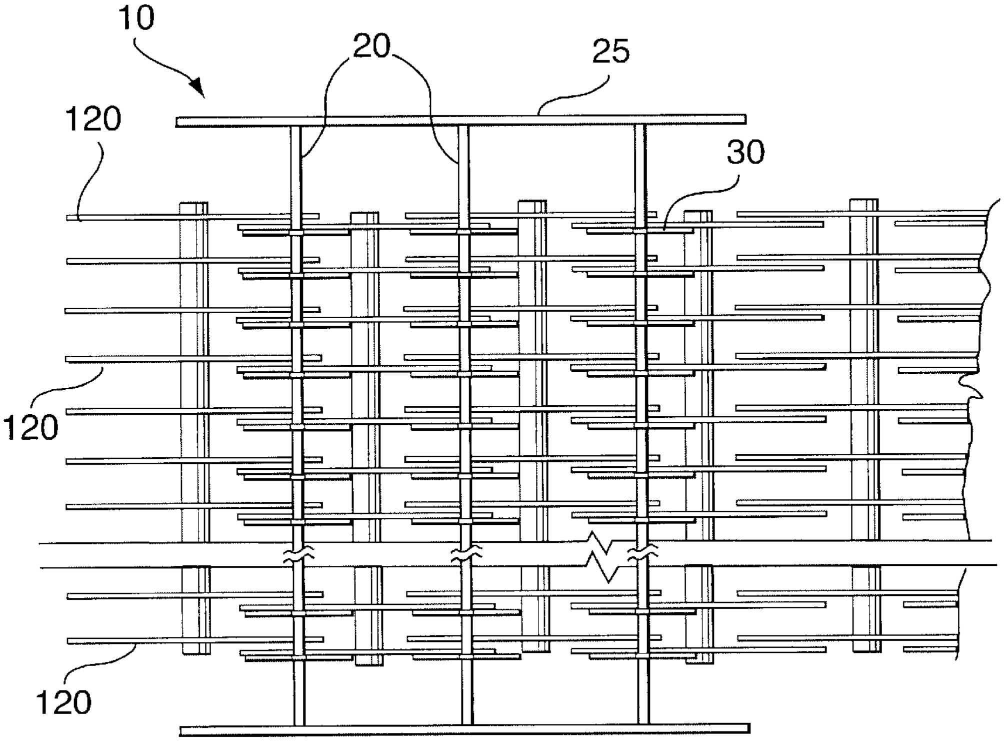
FIG. 4 is a schematic plan view of the system of the present invention positioned above the Bürkner-type orienter shown in FIG. 2.
Figure 5:
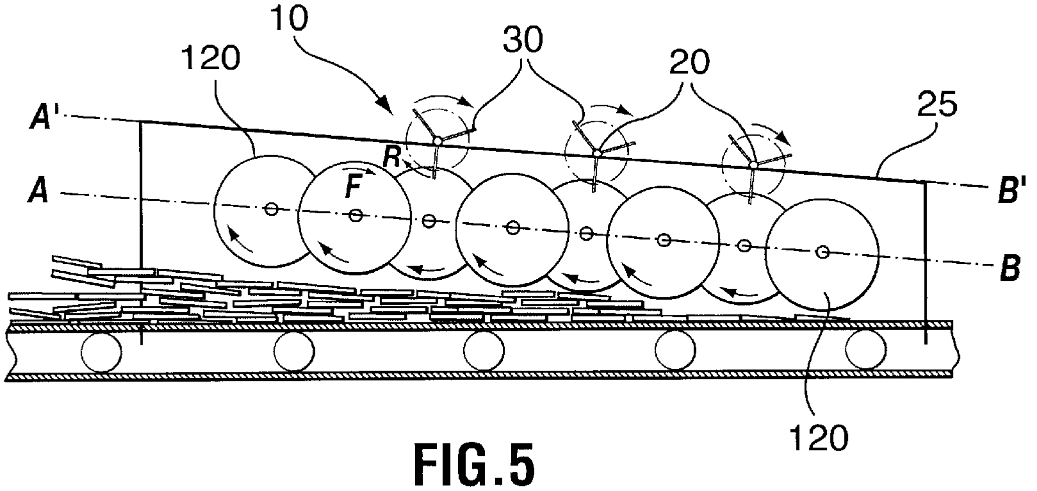
FIG. 5 is a partial side view of the Stokes-type orienter shown in FIG. 3, showing the system of the invention positioned above the orienting disks.
Figure 6:
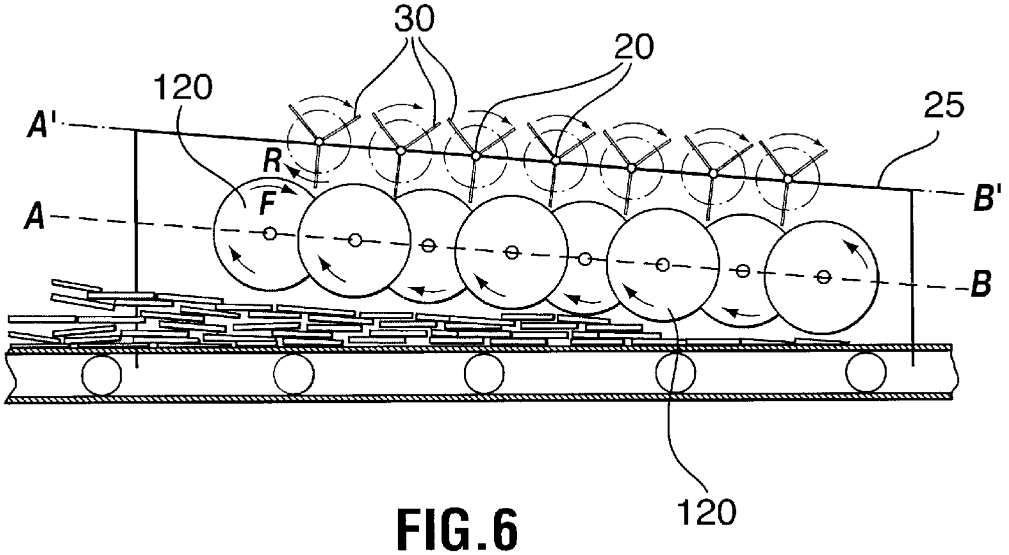
FIG. 6 is a partial side view of the Bürkner-type orienter shown in FIG. 4, showing the system of the invention positioned above the orienting disks.
Figure 7:
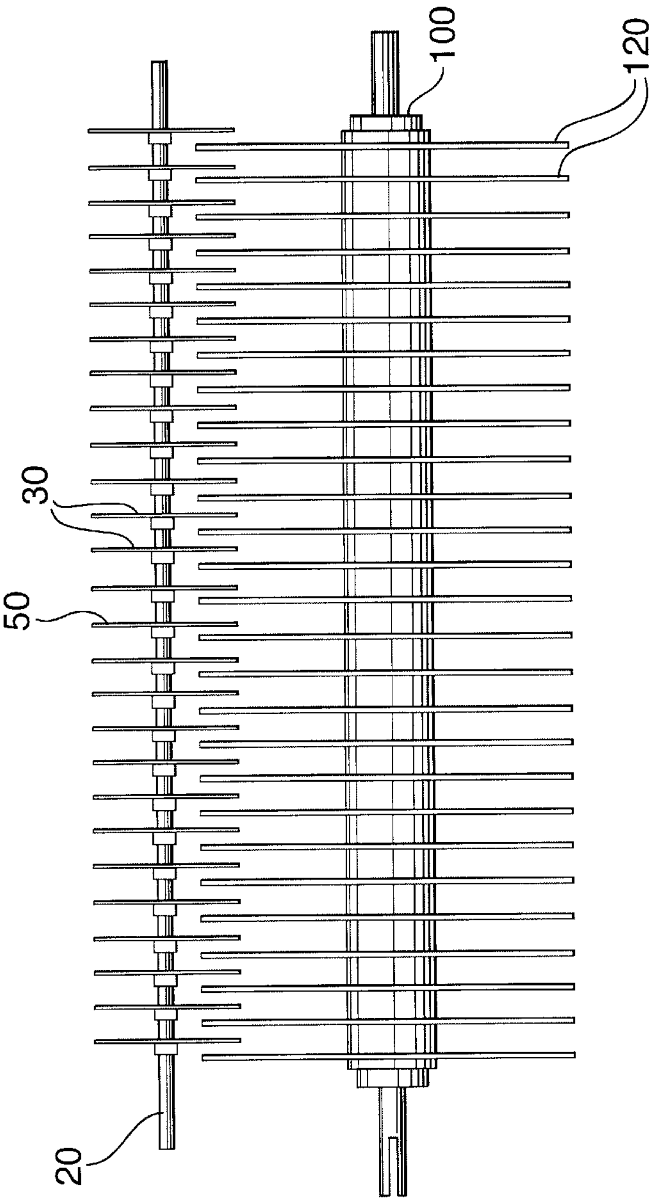
FIG. 7 is a cross-sectional view of an orienter shaft and a pre-orienter shaft of the present invention, taken along line C—C shown in FIG. 3.

Each wheel 30 may be positioned directly over a corresponding disk 120, or, preferably, and as shown in FIGS. 3 and 4, wheels 30 may occupy spaces between two adjacent orienter disks. Wheels 30 may be centered between two disks, as shown in FIG. 3 and FIG. 7, or, preferably, may be closer to one disk than another, as shown in FIG. 4. Further, each pre-orienter shaft 20 may be vertically positioned above one of the orienter shafts, as shown in FIG. 3, or off-set, as shown in FIG. 4. It will be understood that wheels 30 may be rotated by rotating pre-orienter shafts 20.

What is important for the operation of the present system is that pre-orienter shafts 20 and wheels 30 must be so arranged as to allow the end-most portion of each one of finger members 50 to either nearly reach the perimeter of a corresponding orienter disk 120, if wheels 30 are positioned directly above the disks, or to reach at least the boundary of a volume defined between the two adjacent disks with which wheel 30 is intermeshed, if wheels 30 are offset between adjacent disks. By "nearly reach" the perimeter of the disk, it is meant that fingers 50 should not touch the disk, but rather that fingers 50 should be close enough to the disk that they are able to turn any wood strands 130 being carried by the disk.

In a preferred embodiment, at least a portion of the finger members 50 of wheels 30 should pass through a portion of the volume defined between two adjacent disks. In particular, it is desired that each finger member sweep upwardly through the upper portion of the volume defined between the disks. This is accomplished by positioning wheels 30 above disks 120 and allowing wheels 30 to be rotated in the same direction as disks 120. Although wheels 30 are rotated in the same direction as disks 120, it will be appreciated that finger members sweep between the disks in a direction, R (shown in FIG. 5), generally opposing the direction of travel, F, of the upper portions of the disks 120, and the direction of travel of "overs", tending to turn and straighten strands 130 which have been bridged over disks 120, allowing strands 130 to fall between the orienting disks.

The benefits of the system for improving wood strand orientation of the present invention are illustrated by the following experimental results:

Tests were carried out on the Alberta Research Council (ARC) pilot plant Oriented Strand Board (OSB) forming line comparing the performance of the wood strand orienter using the improved orienting disks to the performance of the orienter with rotating orienting fingers mounted immediately adjacent to the orienter disks to the performance of the orienter without the orienting fingers, which is standard orienter configuration. Except for the orienting fingers, there were no differences between the orienter set-ups for the comparative tests. The ARC pilot plant orienting system is typical of commercial OSB strand orienters except that the ARC pilot plant orienter has four shafts of rotating disks, whereas commercial orienters typically have about 12 shafts of rotating disks.

Tests were carried out using a Stokes type of orienter disk arrangement as well as a Bürkner type of orienter disk arrangement. It was found that results for the two types of orienter disk arrangements were similar. Only the results of the Stokes type of orienter disk arrangement are reported here for simplicity.

The following test variables were included in the study:

Disk type:

1) Prior art disk design used in commercial orienters with small notches on the periphery of the disk.

2) Rotating orienting fingers mounted immediately adjacent to the disks over the openings between consecutive disks of the orienter.

Disk spacing:

1) A common mill spacing of 2 inches (50 mm) between disks on adjacent orienter shafts 2) A narrower spacing of 1.5 inches (38 mm) between disks on adjacent orienter shafts Disk speed:

1) Constant 30 RPM for all orienter shafts

2) Low acceleration between orienter shafts (consecutive shaft speeds of 10, 20, 30 and 40 RPM)

3) High acceleration between orienter shafts (consecutive shaft speeds of 15, 30, 45 and 60 RPM).

Strand flow rate:

1) Low flow rate (typical mill flow rate).

2) Medium flow rate (1.5 times typical mill flow rate)

3) High flow rate (2 times typical mill flow rate).

The following conditions were held constant for all tests.

Strands:

Screened mill-produced strands to represent typical face quality strands used throughout the study. Strands were not recycled.

Line speed:

Constant setting of 30 Hz. Orienter height above mat: 2 inches (50 mm).

Replicates:

Three per test condition.

In the first test, the orienter with the rotating fingers was compared to the regular orienter using both a normal and narrow disk spacing as defined above. The following parameters were measured, determined or calculated:

1. The average and median orientation angles of the wood strands in the wood strand mat.
2. The predicted "modulus of elasticity" (MOE) of the end product.
3. The percentage of strands having an orientation angle of less than 20°.
4. The "% error"—this is an indication of the smoothness of the mat, as discussed below.
5. The "% overs"—the percentage of wood strands which "bridged" the disks, being carried over all of them to the end of the orienter without being aligned and without falling to the strand mat.

Results of the first tests are summarized in Table 1:

TABLE 1

Orientation Study Results[1]

| Disk Type | Disk Spacing | Statistic | Average Orient. Angle, ° | Median Orient. Angle, ° | MOE, % of Max. | % of Strands <20° | % Error | % Overs |
|---|---|---|---|---|---|---|---|---|
| Normal | Normal | Mean | 33.1 | 25.0 | 32.6 | 32.3 | 26.0 | 3.39 |
| | | St. Dev. | 2.7 | 3.4 | 3.7 | 6.0 | 3.1 | 0.74 |
| Normal | Narrow | Mean | 27.7 | 18.5 | 39.9 | 43.3 | 9.7 | 8.23 |
| | | St. Dev. | 1.9 | 2.6 | 3.4 | 4.9 | 2.4 | 1.26 |
| Orienting Fingers | Normal | Mean | 31.5 | 24.4 | 34.8 | 34.9 | 24.4 | 0.00 |
| | | St. Dev. | 4.2 | 4.4 | 5.2 | 5.8 | 2.9 | 0.00 |
| Orienting Fingers | Narrow | Mean | 27.4 | 18.9 | 40.1 | 42.8 | 9.1 | 0.51 |
| | | St Dev. | 2.1 | 3.0 | 3.3 | 5.4 | 2.9 | 0.23 |

[1]Twenty seven (27) samples per test cell.

As expected, the narrower disk spacing gave lower mean and median orientation angles, a higher predicted modulus of elasticity (MOE) and a higher incidence of strands with <20° orientation angle. The trends for these measures of orientation were similar for the regular orienter and the orienter with the rotating orienting finger configurations at the same orienter disk spacings.

Orienting fingers drastically reduced the amount of "overs" (strands bridging the orienter disks and carried over the orienter) to nearly zero, even at the highest strand flow rate with narrow disk spacing. The differences in the amount of "overs" between the normal orienting disks and orienting finger configurations were very statistically significant at both normal and narrow disk spacings (Table 2). This behaviour indicates high orienter capacity even at narrow disk spacing with the orienting fingers. This is a most desirable combination to achieve excellent orientation at high production rates. The amount of "overs" increased greatly when disk spacing was decreased for the normal orienter disks (3.39% to 8.23%), but very little for the orienting fingers (0.00% to 0.51%). Test results clearly demonstrate that orienter capacity becomes a limiting factor in standard commercial orienters when trying to improve strand orientation by reducing orienter disk spacing.

It will also be observed from these results that the orienter with narrow disk spacing produced a smoother strand mat, both with and without the orienting fingers, as evidenced by a much lower incidence of error readings from the laser strand orientation system (Table 1). Percent error readings with the orienting fingers and narrow spacing (9.1%) were lower than with the normal disks and narrow spacing (9.7%), but the difference was not statistically significant (Table 2). Strands that are not lying sufficiently flat in the furnish mat do not produce a regular ellipse with the laser orientation measurement system and cause an error reading in the system.

A smoother strand mat is advantageous for several reasons. Strands falling onto an uneven, partially formed strand mat will have a greater probability of becoming less well oriented. Thus the final strand mat produced from multiple layers of uneven strands will tend to have poorer overall orientation than one produced from multiple layers of even strands. An uneven strand mat will have lower bulk density, resulting in a thicker strand mat, which will require greater press daylight and require more time for the press to close to thickness. More strand breakage during press closing would be expected with an uneven strand mat with many strands sticking up out of the mat. Broken strands reduce product strength.

Table 2 contains results of statistical t-tests comparing the different variables in Table 1 to indicate which ones were statistically significant:

TABLE 2

Results of Statistical t-tests comparing test variables.

| Orienter Configurations Compared | Variable Measured | Value 1 | Value 2 | Statistical Significance[1] |
|---|---|---|---|---|
| Normal Disks/ | Average Angle, ° | 33.1 | 27.7 | *** |
| Normal Spacing vs | Median Angle, ° | 25.0 | 18.5 | *** |
| Normal Disks/ | MOE, % of Max. | 32.6 | 39.9 | *** |
| Narrow Spacing | % Strands <20° | 32.3 | 43.3 | *** |
| | % Error | 26.0 | 9.7 | *** |
| | % Overs | 3.39 | 8.23 | *** |
| Orienting Fingers/ | Average Angle, ° | 31.5 | 27.4 | *** |
| Normal Spacing vs | Median Angle, ° | 24.4 | 18.9 | *** |
| Orienting Fingers/ | MOE, % of Max. | 34.8 | 40.1 | *** |
| Narrow Spacing | % Strands <20° | 34.9 | 42.8 | *** |
| | % Error | 24.4 | 9.1 | *** |
| | % Overs | 0.00 | 0.51 | *** |
| Normal Disks/ | Average Angle, ° | 33.1 | 31.5 | NS |
| Normal Spacing vs | Median Angle, ° | 25.0 | 24.4 | NS |
| Orienting Fingers/ | MOE, % of Max. | 32.6 | 34.8 | NS |
| Normal Spacing | % Strands <20° | 32.3 | 34.9 | NS |
| | % Error | 26.0 | 24.4 | * |

TABLE 2-continued

Results of Statistical t-tests comparing test variables.

| Orienter Configurations Compared | Variable Measured | Value 1 | Value 2 | Statistical Significance[1] |
|---|---|---|---|---|
| | % Overs | 3.39 | 0.00 | *** |
| Normal Disks/ | Average Angle, ° | 33.1 | 27.4 | *** |
| Normal Spacing vs | Median Angle, ° | 25.0 | 18.9 | *** |
| Orienting Fingers/ | MOE, % of Max | 32.6 | 40.1 | *** |
| Narrow Spacing | % Strands <20° | 32.3 | 42.8 | *** |
| | % Error | 26.0 | 9.1 | *** |
| | % Overs | 3.39 | 0.51 | *** |
| Normal Disks/ | Average Angle, ° | 27.7 | 27.4 | NS |
| Narrow Spacing vs | Median Angle, ° | 18.5 | 18.9 | NS |
| Orienting Fingers/ | MOE, % of Max. | 39.9 | 40.1 | NS |
| Narrow Spacing | % Strands <20° | 43.3 | 42.8 | NS |
| | % Error | 9.7 | 9.1 | NS |
| | % Overs | 8.23 | 0.51 | *** |

[1]NS = difference not significant;
* = difference significant at 95% confidence level;
** = difference significant at 99% confidence level;
*** = difference significant at 99.9% confidence level Table 3 indicates that strand flow rate had little effect on any of the parameters measured, with the possible exception of % error. With narrow disk spacing, in some cases, there appeared to be a trend toward a flatter mat (lower % error) as the strand flow rate increased. Mats produced with narrow disk spacing were flatter than those produced with wider disk spacing in all cases as evidenced by their much lower % error values.

TABLE 3

Effect of strand flow rate on performance of the different orienter types[1].

| Disk Type | Disk Spacing | Strand Flow Rate | Average Orient. Angle, ° | Median Orient. Angle, ° | MOE, % of Max. | % of Strands <20° | % Error | % Overs |
|---|---|---|---|---|---|---|---|---|
| Normal | Normal | Low | 32.8 | 24.5 | 32.8 | 33.4 | 25.4 | 3.22 |
| | | | 3.1 | 3.6 | 3.7 | 6.6 | 3.4 | 0.50 |
| " | " | Medium | 33.2 | 24.5 | 32.5 | 31.9 | 25.9 | 3.58 |
| | | | 2.4 | 3.7 | 4.8 | 7.4 | 2.0 | 0.86 |
| " | " | High | 33.4 | 25.8 | 32.4 | 31.7 | 26.7 | 3.38 |
| | | | 2.9 | 3.1 | 2.8 | 4.1 | 3.7 | 0.85 |
| Normal | Narrow | Low | 27.5 | 19.1 | 38.8 | 42.8 | 11.4 | 8.33 |
| | | | 2.0 | 3.0 | 4.0 | 5.6 | 1.4 | 1.27 |
| " | " | Medium | 27.7 | 18.0 | 40.2 | 43.7 | 8.0 | 8.74 |
| | | | 1.0 | 0.7 | 2.2 | 2.0 | 1.6 | 1.11 |
| " | " | High | 27.9 | 18.2 | 40.7 | 43.5 | 9.6 | 7.62 |
| | | | 2.4 | 3.3 | 3.9 | 6.5 | 2.8 | 1.26 |
| Orienting | Normal | Low | 33.3 | 26.7 | 31.9 | 31.5 | 24.6 | 0.00 |
| Fingers | | | 4.3 | 4.5 | 4.7 | 5.5 | 3.3 | 0.00 |
| Orienting | " | Medium | 31.5 | 24.2 | 35.3 | 35.5 | 24.6 | 0.00 |
| Fingers | | | 3.9 | 4.6 | 4.9 | 5.8 | 3.2 | 0.00 |
| Orienting | " | High | 29.5 | 22.1 | 37.1 | 37.0 | 24.2 | 0.00 |
| Fingers | | | 3.8 | 3.1 | 5.1 | 3.8 | 2.5 | 0.00 |
| Orienting | Narrow | Low | 28.4 | 20.8 | 37.9 | 40.1 | 12.4 | 0.55 |
| Fingers | | | 2.1 | 3.1 | 2.5 | 5.4 | 1.8 | 0.34 |
| Orienting | " | Medium | 26.3 | 17.2 | 41.5 | 45.4 | 6.9 | 0.47 |
| Fingers | | | 2.0 | 2.4 | 3.4 | 4.9 | 1.6 | 0.12 |
| Orienting | " | High | 27.3 | 18.6 | 41.1 | 43.0 | 7.7 | 0.50 |
| Fingers | | | 1.7 | 2.4 | 2.8 | 4.7 | 1.3 | 0.19 |

[1]Nine (9) samples per test cell. The top number given in each cell is the mean value and the bottom number is the standard deviation.

Table 4 indicates that orienter disk speed had little effect on any of the parameters measured, with the possible exception of % overs, which is the percentage of strands bridging the orienter disks and carried across the top of the orienter without falling through the orienter. In some cases the % overs appeared to increase as the orienter disk speed was accelerated from one bank of disks to the next.

TABLE 4

Effect of orienter disk speed on performance of the different orienter types[1].

| Disk Type | Disk Spacing | Orienter Disk Speed | Average Orient. Angle, ° | Median Orient. Angle, ° | MOE, % of Max. | % of Strands <20° | % Error | % Overs |
|---|---|---|---|---|---|---|---|---|
| Normal | Normal | Constant | 34.5 | 26.6 | 30.6 | 30.3 | 25.1 | 2.81 |
| | | | 2.0 | 2.8 | 3.1 | 5.4 | 2.5 | 0.20 |
| " | " | Low | 32.0 | 23.9 | 33.4 | 33.7 | 25.2 | 3.16 |
| | | Accel. | 2.7 | 3.2 | 4.1 | 6.6 | 3.7 | 0.28 |
| " | " | High | 33.0 | 24.4 | 33.7 | 33.0 | 27.6 | 4.21 |
| | | Accel. | 2.9 | 3.8 | 3.4 | 6.1 | 2.5 | 0.69 |
| Normal | Narrow | Constant | 27.8 | 18.6 | 39.5 | 42.8 | 10.4 | 8.27 |
| | | | 2.3 | 2.7 | 3.6 | 5.5 | 2.2 | 1.50 |
| " | " | Low | 25.2 | 16.6 | 37.1 | 40.7 | 9.0 | 8.00 |
| | | Accel. | 2.2 | 3.5 | 4.0 | 6.3 | 2.6 | 1.39 |
| " | " | High | 27.9 | 18.9 | 39.7 | 42.8 | 9.0 | 7.73 |
| | | Accel. | 1.1 | 1.3 | 2.8 | 2.3 | 2.3 | 0.68 |
| Orienting | Normal | Constant | 33.7 | 26.7 | 31.9 | 32.3 | 26.0 | 0.00 |
| Fingers | | | 1.7 | 2.3 | 3.2 | 4.0 | 3.8 | 0.00 |
| Orienting | " | Low | 32.7 | 25.5 | 34.1 | 33.8 | 24.0 | 0.00 |
| Fingers | | Accel. | 5.5 | 5.6 | 6.1 | 7.0 | 2.5 | 0.00 |
| Orienting | " | High | 28.0 | 20.8 | 38.3 | 38.6 | 23.4 | 0.00 |
| Fingers | | Accel. | 2.0 | 1.9 | 4.0 | 4.1 | 1.7 | 0.00 |
| Orienting | Narrow | Constant | 27.6 | 18.7 | 40.4 | 43.9 | 9.0 | 0.35 |
| Fingers | | | 2.3 | 3.3 | 3.4 | 4.7 | 2.9 | 0.18 |
| Orienting | " | Low | 27.0 | 18.4 | 40.3 | 43.4 | 9.4 | 0.48 |
| Fingers | | Accel. | 2.5 | 3.0 | 3.6 | 5.9 | 3.5 | 0.23 |
| Orienting | " | High | 27.2 | 19.6 | 39.3 | 40.6 | 8.9 | 0.68 |
| Fingers | | Accel. | 1.3 | 2.8 | 3.0 | 5.6 | 2.7 | 0.14 |

[1]Nine (9) samples per test cell. The top number given in each cell is the mean value and the bottom number is the standard deviation.

It will be clear to those skilled in the art from these experimental data that the rotating orienting fingers improve strand formation in orienters.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for improving wood strand orientation in a wood strand orienter having a plurality of axially-spaced, parallel orienter shafts positioned in a first plane, each shaft bearing a plurality of axially spaced orienter disks, the system comprising:

a) a plurality of axially-spaced, parallel pre-orienting shafts positioned in a second plane above and substantially parallel to said first plane, said pre-orienting shafts substantially parallel to said orienter shafts; and b) a plurality of wheels mounted on each one of said pre-orienting shafts, each one of said wheels having a hub and a plurality of finger members extending radially outwardly from said hub, each one of said wheels positioned between two adjacent orienter disks to extend downwardly into a volume defined between the two adjacent orienter disks; wherein one wheel is positioned between each pair of adjacent ones of said disks, said wheel positioned closer to one of said adjacent disks than to the other.

2. The system claimed in claim 1, further comprising one pre-orienter shaft associated with each one of said orienter shafts.

3. The system claimed in claim 2 wherein each pre-orienter shaft is positioned vertically above one of said orienter shafts.

4. The system claimed in claim 1 wherein each one of said wheels has between 2 and 6 finger members.

5. The system claimed in claim 1 wherein said wheels are rotatable by rotating said pre-orienter shafts, and wherein said pre-orienter shafts are rotated in the same direction as said orienter shafts such that said finger members sweep in a direction opposed to direction of the tops of the orienter disks.

6. The system claimed in claim 1 wherein said disks and said wheels are spaced by a distance of 2 inches.

7. The system claimed in claim 1 wherein said disks and said wheels are spaced by a distance of 1.5 inches.

8. A system for improving wood strand orientation in a wood strand orienter having a plurality of axially-spaced, parallel orienter shafts positioned in a first plane, each shaft bearing a plurality of axially spaced orienter disks, the system comprising:

a) a plurality of axially-spaced, parallel pre-orienting shafts positioned in a second plane above and substantially parallel to said first plane, said pre-orienting shafts substantially parallel to said orienter shafts; and b) a plurality of wheels mounted on each one of said pre-orienting shafts, each one of said wheels having a hub and a plurality of finger members extending radially outwardly from said hub, each one of said wheels positioned between two adjacent orienter disks to extend downwardly to the boundary of a volume defined between the two adjacent orienter disks.

* * * * *